April 24, 1956    V. J. ESPOSITO, JR    2,742,725
CHRISTMAS TREE ORNAMENT
Filed March 10, 1953
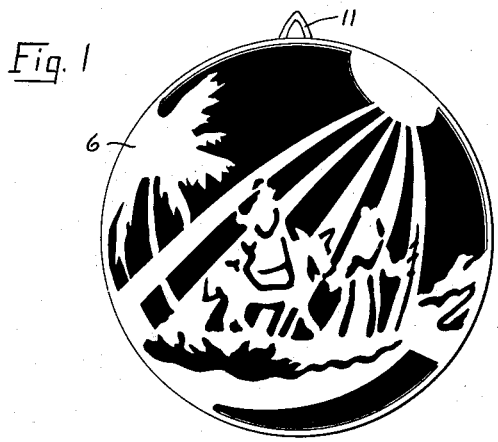
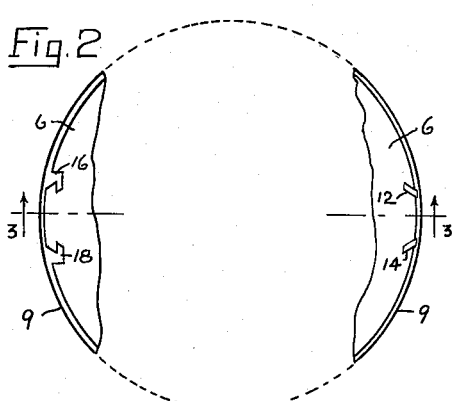
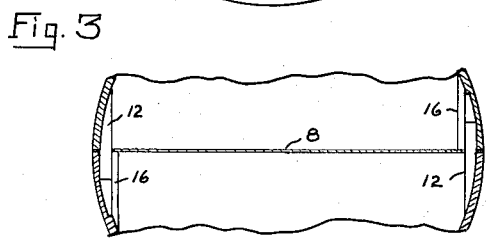
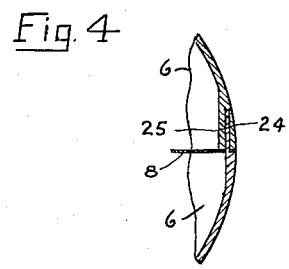
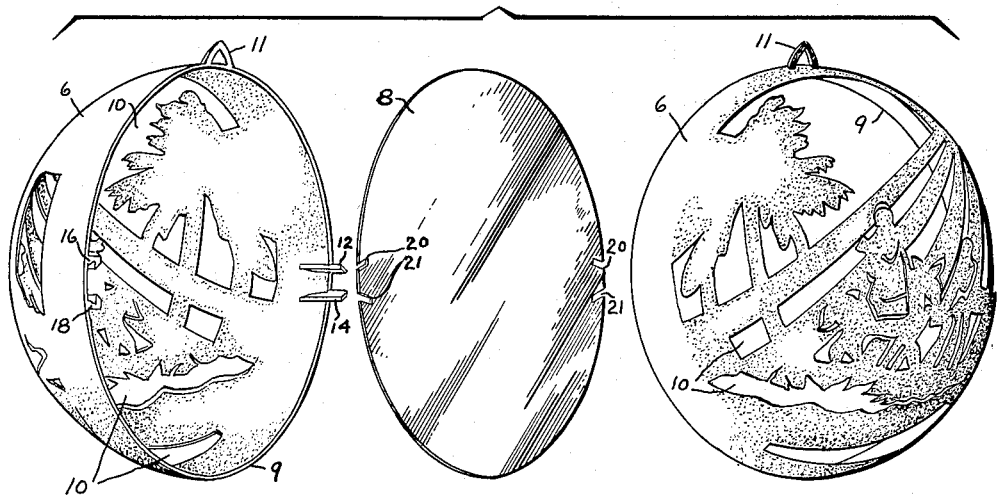
INVENTOR.
VINCENT J. ESPOSITO, JR.
BY
Churchill, Rich, Weymouth & Engel
ATTORNEYS

United States Patent Office 2,742,725
Patented Apr. 24, 1956

2,742,725

CHRISTMAS TREE ORNAMENT

Vincent J. Esposito, Jr., Wayne Township, Passaic County, N. J., assignor to Ejur Associates, Inc., Clifton, N. J., a corporation of New Jersey Application March 10, 1953, Serial No. 341,440

5 Claims. (Cl. 41—10)

This invention relates to ornaments for use on Christmas trees or the like.

The general objects of the invention are to provide an article of the kind mentioned which may be cheaply manufactured and which is of unique and attractive appearance. To this end, the invention comprises two hemispherical or other three dimensional shells at least one having an openwork design between which a background disc in interposed, the shells being joined together at their edges. The disc is of sheet material, having light reflecting characteristics contrasting with the outer surfaces of the shells, suitable means being provided for retaining said shells and the disc of sheet material in assembled relation.

The invention will best be understood from the following detailed description of the present preferred embodiment thereof taken in connection with the drawings in which, Fig. 1 is an elevation of one side of an ornament;

Fig. 2 is a fragmentary view looking into one of the shells of the ornament showing the interlocking parts by which the parts of the ornament are retained in assembled relation;

Fig. 3 is a fragmentary view on the line 3—3 of Fig. 2, illustrating how the interlocking parts of the shells and disc cooperate;

Fig. 4 shows a modified form of locking means; and

Fig. 5 is an exploded perspective view of the three parts of an ornament ready for assembly.

Referring to the drawing, the ornament is shown as made up of two shells 6 and a disc 8 of sheet material, adapted to be interposed between the edges 9 of said shells. The shells 6 are preferably made of thin molded plastic and are preferably identical in shape so that they can be made in the same mold. However, they may differ in shape provided they have matching edges. At least one and preferably both of said shells 6 are provided with openings 10 so as to provide an ornamental appearance in the nature of a silhouette of any desired kind. The particular design shown is, of course, merely illustrative. As least one and preferably both of said shells are provided with a perforated ear 11 by which the article may be suspended. In the case of identical shells the ear is so placed that the two ears match when joined.

The illustrated means for retaining the shells 6 and disc 8 in assembled relation comprises prongs 12 and 14 and lugs 16 and 18 which are adapted to cooperate with one another in a manner evident from Fig. 3. As shown in Fig. 5, the disc 8 is provided with locating and clearance notches 20 and 21 adapted to cooperate with and closely surround the prongs 12 and 14. Therefore, when the parts are assembled, the disc 8 is properly retained in position between the edges 9 of the shells 6. The shells 6 may be held in engagement with the disc 8 merely by the frictional engagement of the prongs 12 and 14 with the lugs 16 and 18; but, if desired, a suitable adhesive may be applied to the prongs or lugs to make the assemblage of parts more secure.

Fig. 4 shows a modified form of retaining means which comprises a simple tongue 24 which fits into a pocket 25, each shell 6 being provided with a tongue and a pocket disposed diametrically opposite one another.

The shells 6 and disc 8 may be made of any suitable material. For example, the shells may be of thin molded plastic, and the disc may be cut from a thin sheet of plastic having a metalized surface obtainable in various colors, which is lustrous and highly light-reflecting and produces a pleasing effect as the background for the design produced by the openings in the shells. While a lustrous or shiny disc is, perhaps, most attractive, the principle involved is the use of a disc having light-reflecting characteristics which contrast with the light-reflecting properties of the outer surfaces of the shells. This contrast may be a matter of color or of the amount of light reflected or both. For example, a dull black disc might be used with a white plastic shell as suggested by Fig. 1.

Since all that is required to assemble an ornament, constructed in accordance with the invention, is to snap two shells together with a disc between them and since the hemispherical shells can be nested in one another to a considerable extent, the disassembled ornaments can be stored or shipped in a much smaller space than would be required for complete ornaments. Furthermore the disassembled elements, shells and discs, can be supplied in a variety of colors so that the user can make up ornaments in various color combinations to suit his taste.

While the disc 8 as illustrated has a plane surface it may be embossed, if desired, with any sort of raised design to change its appearance and give it light scattering properties.

Transparent colored material may be used for the disc so that the ornament may be suspended in front of a light source which acts to illuminate the disc, thus providing an illuminated colored background for the silhouette.

It is to be understood that the invention, as hereinafter defined in the claims, is not limited to all details of construction in the embodiment particularly described above merely as an illustration of the invention.

What I claim is:

1. An ornamental article comprising two opaque shells having matching edges, at least one of said shells having cut out portions forming a design therein, a substantially flat separate disc of sheet material of light-reflecting properties contrasting with those of the surface of the shells interposed between the edges of said shells, and means for retaining said shells and disc of sheet material in fixed assembled relation.

2. An ornamental article comprising two opaque thin shells of molded material having matching edges and adapted to enclose a space between them when said edges are joined, at least one of said shells having cut out portions therein forming a design, a separate disc of sheet material of light-reflecting properties contrasting with those of the surface of the shells interposed between the edges of said shells, and complementary fastening means molded into said shells adjacent their edges for retaining said shells and disc of sheet material in fixed assembled relation.

3. An ornamental article comprising two opaque thin shells of molded material having matching edges, at least one of said shells having cut out portions therein forming an ornamental design, each of said shells being provided adjacent its edge with prongs and lugs adapted to cooperate respectively with the lugs and prongs on the other shell, and a separate disc of sheet material of light reflecting properties contrasting with those of the surface of the shells interposed between the edges of said shells and provided at its edge with notches adapted to fit around said prongs.

4. An ornamental article comprising two identical thin shells of molded material having matching edges, said shells having cut out portions therein forming an ornamental silhouette design, each of said shells being provided on its inside adjacent its edge with diametrically oppositely located pairs of prongs and pairs of lugs adapted to cooperate respectively with the pairs of lugs and pairs of prongs on the other shell, and a flat disc of light-reflecting sheet material interposed between the edges of said shells and provided at its edge with notches adapted to cooperate with the prongs on said shells to locate said disc between the edges of said shells.

5. An ornamental article comprising, a pair of thin molded hemispherical shells of identical structural formation, each of said shells having complementary locking means extending substantially perpendicular to the plane of the edge of said shell, said means comprising a tongue extending beyond the edge of said shell and a lug extending within said shell of a size to receive said tongue, said tongue and said lug being on diametrically opposite sides of the shell, said shells having openings forming a silhouette design, a disc interposed and held between the edges of said shells and having light-reflecting properties contrasting with the exterior surfaces of said shells whereby it provides a background for said design.

References Cited in the file of this patent
UNITED STATES PATENTS

| | | |
|---|---|---|
| 1,979,888 | Kranz et al. | Nov. 6, 1934 |
| 2,097,061 | Graf | Oct. 26, 1937 |
| 2,504,650 | Chessrown | Apr. 18, 1950 |
| 2,540,502 | Aschbacher | Feb. 6, 1951 |